(12) United States Patent
Sauer

(10) Patent No.: US 10,349,586 B2
(45) Date of Patent: Jul. 16, 2019

(54) STUMP PULLING APPARATUS

(71) Applicant: Savannah Global Solutions, LLC, Pembroke, GA (US)

(72) Inventor: Mark A. Sauer, Pembroke, GA (US)

(73) Assignee: Savannah Global Solutions, LLC, Pembroke, GA (US)

( * ) Notice: Subject to any disclaimer, the term of this patent is extended or adjusted under 35 U.S.C. 154(b) by 287 days.

(21) Appl. No.: 15/467,092

(22) Filed: Mar. 23, 2017

(65) Prior Publication Data

US 2018/0271037 A1  Sep. 27, 2018

(51) Int. Cl.
*A01G 23/06*  (2006.01)

(52) U.S. Cl.
CPC .................. *A01G 23/062* (2013.01)

(58) Field of Classification Search
CPC ............... A01G 23/062; A01G 23/067
See application file for complete search history.

(56) References Cited

U.S. PATENT DOCUMENTS

| | | | | |
|---|---|---|---|---|
| 3,815,266 A | * | 6/1974 | Schmitz | A01G 23/062 172/175 |
| 3,898,752 A | * | 8/1975 | Ulve | A01G 23/062 171/58 |
| D247,567 S | * | 3/1978 | Haataja | D15/11 |
| 4,690,183 A | * | 9/1987 | Eilertson | A01G 23/067 144/24.12 |
| 5,482,120 A | * | 1/1996 | Lloyd | A01B 41/04 172/21 |
| 5,513,486 A | * | 5/1996 | Le Maigat | A01D 42/005 56/503 |
| 2013/0061984 A1 | * | 3/2013 | Helmsderfer | A01G 23/06 144/24.12 |
| 2014/0250741 A1 | * | 9/2014 | Simmons | A01G 23/062 37/302 |
| 2017/0347541 A1 | * | 12/2017 | Casper | A01G 23/067 |

* cited by examiner

*Primary Examiner* — Emmanuel M Marcelo
(74) *Attorney, Agent, or Firm* — Quarles & Brady LLP

(57) ABSTRACT

A stump pulling apparatus comprises a frame, a pair of arms, a pair of stump-engaging wheels, and a drawbar. The pair of arms are pivotally mounted to the frame. The pair of stump-engaging wheels are each rotatably mounted on the pair of arms at a rear end of the corresponding one of the pair of arms. The drawbar includes a front segment, configured to engage the vehicle for towing the stump pulling apparatus and slidably coupled to the rear segment, a rear segment coupled to each of the pair of arms, and a displacement cylinder coupled to and intermediately disposed between the front segment and the rear segment. When the front segment of the drawbar is pulled forward, the displacement cylinder provides a forwardly-acting force on the rear segment, which pivots the pair of arms toward each other, thereby forcibly bringing the stump-engaging wheels together.

20 Claims, 10 Drawing Sheets

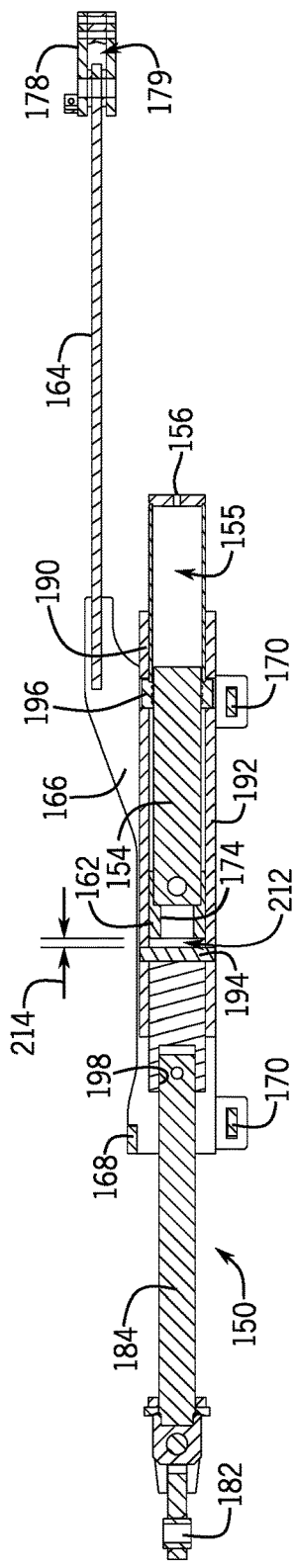
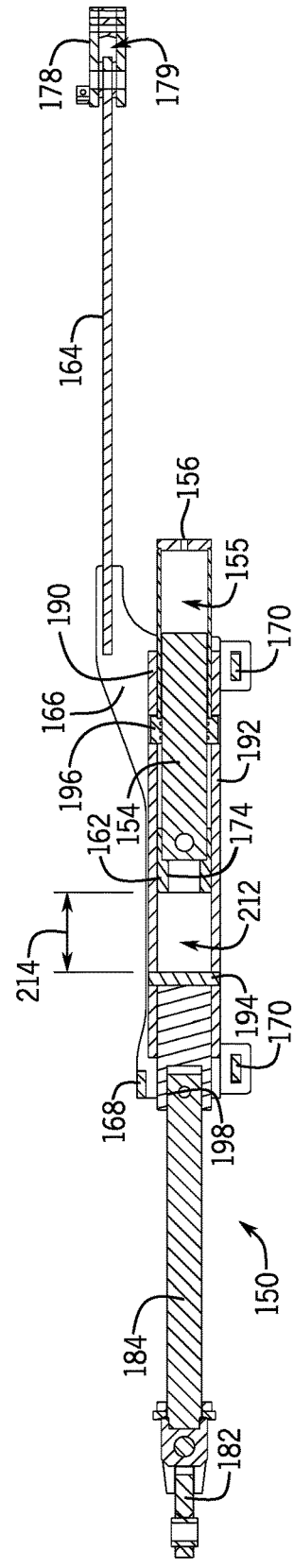
FIG. 9A
FIG. 9B

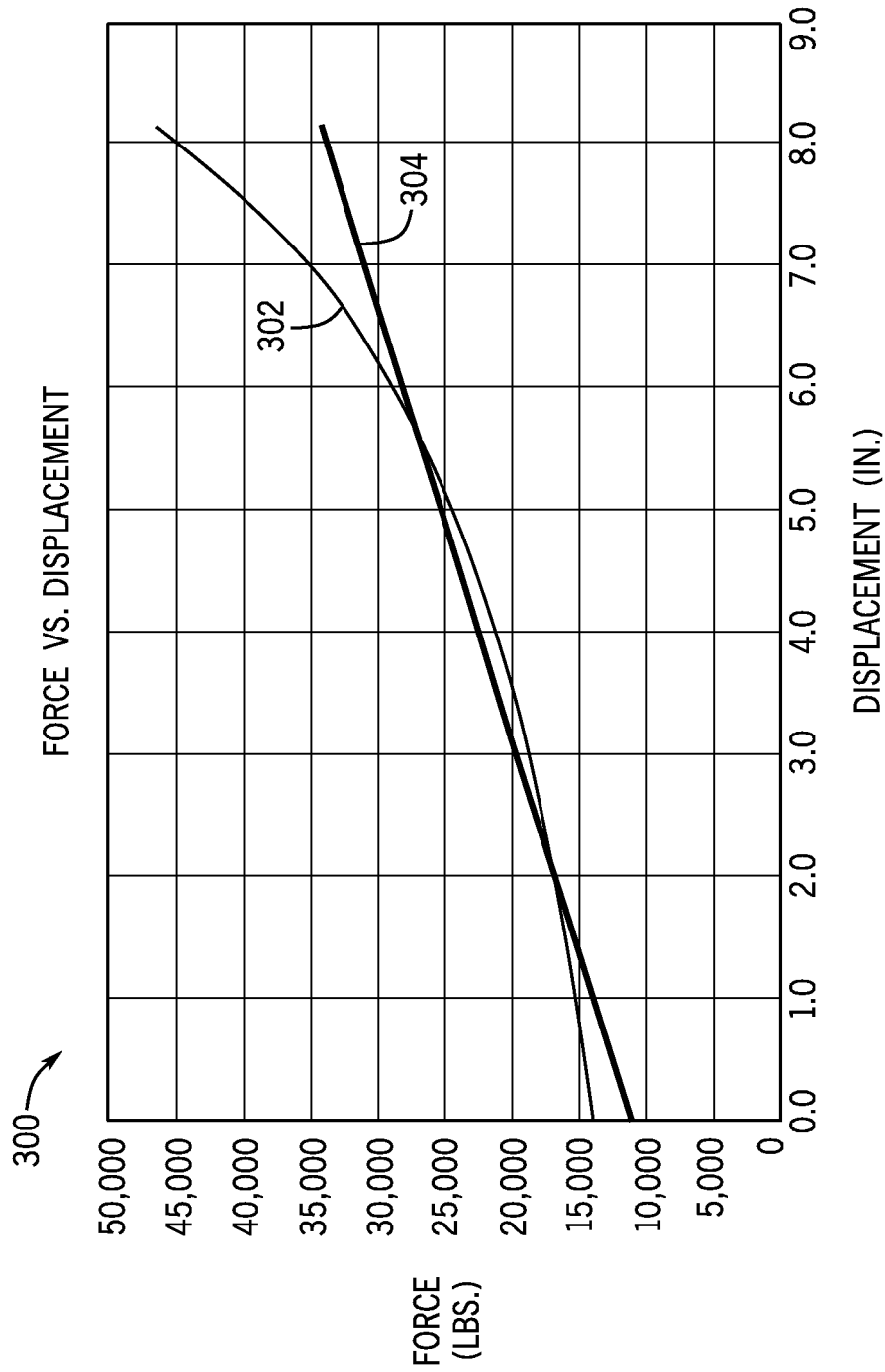

STUMP PULLING APPARATUS

CROSS-REFERENCE TO RELATED APPLICATION

Not applicable.

STATEMENT OF FEDERALLY SPONSORED RESEARCH OR DEVELOPMENT

Not applicable.

TECHNICAL FIELD

This application relates generally to an apparatus for removing stumps from the ground. More specifically, this application relates to a drawbar that provides improved clamping force when removing stumps from the ground using rotatable implements.

BACKGROUND

Stump pulling apparatuses are generally towed behind a vehicle and are used to pull stumps from the ground. Typically, these towable stump pulling apparatuses include a drawbar that connects to a pair of stump-engaging wheels or rotatable implements, which are ultimately responsible for the stump removal. Typically, the drawbar is equipped with various types of compression springs, which are configured to provide a clamping force to the pair of stump-engaging wheels so as to bias the pair of stump-engaging wheels together. When the wheels engage a stump, the wheels temporarily separate against this clamping force around the circumference of the stump with the continued compressive force causing the wheels to engage the stump to a sufficient degree that, as the wheels continue to turn, they pull the stump from the ground.

Compression springs have been used with success for moderately-sized stumps, but have their limitations in application. For example, increased amounts of compressive force are required to withdraw a larger diameter stump; however, given the overall size of the stump puller, there may not be sufficient space to install a spring of the necessary parameters. Still further, compression springs cannot typically be adjusted based on varying stump sizes and soil conditions without entirely removing and replacing the spring(s), which takes time and can pose technical difficulties for those not having the proper training or tools. Moreover, compression springs breakdown and fatigue with time and therefore require periodic replacement.

SUMMARY

Disclosed herein is an improved stump pulling apparatus that utilizes a displacement cylinder in lieu of a spring to provide improved clamping force to the pair of stump-engaging wheels.

According to one aspect, a stump pulling apparatus is provided that is configured to be towed by a vehicle. The stump pulling apparatus comprises a frame, a pair of arms, a pair of stump-engaging wheels, and a drawbar. The pair of arms are pivotally mounted to the frame. Each of the pair of arms extends both rearwardly and away from a central axis of the frame. The pair of stump-engaging wheels are each rotatably mounted on a corresponding one of the pair of arms at a rear end of the corresponding one of the pair of arms. The drawbar includes a front segment, a rear segment, and a displacement cylinder coupled to and intermediately disposed between the front segment and the rear segment. The front segment is configured to engage the vehicle for towing the stump pulling apparatus and is slidably coupled to the rear segment. The rear segment is coupled to each of the pair of arms. When the front segment of the drawbar is pulled forward, the displacement cylinder provides a forwardly-acting force on the rear segment, which pivots the pair of arms toward each other thereby forcibly bringing the stump-engaging wheels together.

In some instances, when the pair of stump-engaging wheels are forcibly brought together, the pair of stump-engaging wheels may be configured to engage a stump that has a diameter between about 4 inches and about 23 inches. When the pair of stump-engaging wheels engage the stump, the displacement cylinder may provide sufficient forwardly acting force on the rear segment, such that the pair of stump-engaging wheels are capable of pulling the stump out of the ground.

In some other instances, the front segment may have a hitch, a rod, and a front body. The hitch may be configured to engage or be attached to the vehicle. The rod may be coupled to and extending between the hitch and the front body. The front body may be engaged by or fixed to a part of the displacement cylinder. Additionally, the rear segment may have a tail extension and a rear body. The tail extension may engage or be coupled to each of the pair of arms. The rear body may be engaged by or fixed to a part of the displacement cylinder (that is different than the part to which the front body is fixed to such that the parts may be movable or displaceable relative to one another).

In yet some other instances, the frame may include a front portion and a rear portion. The front portion may slidably engage the drawbar. The rear portion may hingedly engage the front portion and include a pair of towing wheels disposed at a rear end of the rear portion. The pair of towing wheels may be actuatable using a pair of towing wheel displacement cylinders to do one of lower the pair of towing wheels, thereby raising the pair of stump-engaging wheels out of engagement with the ground, and raise the pair of towing wheels, thereby lowering the pair of stump-engaging wheels into engagement with the ground In still some other instances, the stump pulling apparatus may further comprise a pair of cutting wheels coupled to the frame and disposed in front of the pair of stump-engaging wheels. The pair of cutting wheels may be actuatable using a pair of cutting wheel displacement cylinders to do one of lower the cutting wheels into engagement with the ground to cur roots near the stump and raise the cutting wheels out of engagement with the ground.

In some other instances, each of the pair of arms may further include a stump-engaging wheel scraper. The stump-engaging wheel scraper may be configured to remove debris from the corresponding stump-engaging wheel.

In yet some other instances, the displacement cylinder may be pneumatically charged.

According to another aspect, a drawbar is provided for a stump pulling apparatus. The stump pulling apparatus is configured to be towed by a vehicle and has a pair of pivotal arms. Each of the pair of pivotal arms includes a stump-engaging wheel. The drawbar comprises a displacement cylinder interposed between a front segment and a rear segment. The displacement cylinder includes a hollow outer cylinder and an inner rod. The inner rod is partially enclosed by the hollow outer cylinder, thereby creating an internal pressure chamber. The front segment has a hitch, a rod, and a front body. The hitch is configured to engage the vehicle.

The rod is coupled to and extends between the hitch and the front body. The front body is coupled to one of the hollow outer cylinder and the inner rod. The rear segment has a tail extension and a rear body. The tail extension is configured to be coupled to each of the pair of pivotal arms. The rear body is coupled to a different one of the hollow outer cylinder and the inner rod. The front body is slidably coupled to the rear body and, when the front body is pulled forward, pressure is built within the pressure chamber of the displacement cylinder which is configured to provide a forwardly-acting force on the rear body.

In some instances, when the rear body is pulled forward, the tail extension may be configured to pivot the pair of arms toward each other and forcibly bring the stump-engaging wheels together.

In some other instances, the displacement cylinder may be a pneumatically charged displacement cylinder.

In yet some other instances, the forwardly-acting force may increase semi-exponentially when the front body is slid rearward with respect to the rear body.

In some instances, the front body may include a pair of opposed walls. Each of the pair of opposed walls may include at least one slot. The rod may be coupled to an outer sleeve cylinder, and the outer sleeve cylinder may engage the at least one slot. The hollow outer cylinder may engage the at least one slot.

In some other instances, the tail extension may include a cable-engagement mechanism having a curved internal cable path. The curved internal cable path may be configured to engage a cable, which engages each of the pair of pivotal arms.

There are various potential advantages of the structures disclosed herein. Most notably, the displacement cylinder can provide increased amounts of compressive force with less overall displacement, meaning that the stump pulling apparatus to which the draw bar is attached can pull larger diameter stumps (i.e., even stumps of 23 inches or possibly greater) in comparison to compressive spring designs (which are frequently limited to 18 inch diameter stumps). Moreover, by utilizing a displacement cylinder instead of a compression spring, the compressive force applied to the arms (and, therefore, the stump-pulling implements) may be dynamically controlled to suit conditions. Still further, limitations on compressive force that would be based on the physical size of a compression spring can be outright avoided by use of a displacement cylinder that is selectively pressurized—meaning that higher compressive loads can be generated with less physical displacement. Also, by eliminating a physical compression spring, maintenance is made easier because there may be less service to perform and, even when there is service, it does not require removal and unloading of a spring, which can be extremely difficult to do.

These and still other advantages of the invention will be apparent from the detailed description and drawings. What follows is merely a description of some preferred embodiments of the present invention. To assess the full scope of the invention, the claims should be looked to as these preferred embodiments are not intended to be the only embodiments within the scope of the claims.

BRIEF DESCRIPTION OF THE FIGURES

FIG. 9A is a cross-sectional view of the drawbar of FIG. 4, taken along lines 9-9;

FIG. 9B is a cross-sectional view similar to FIG. 9A, but shown with the rear segment slid rearwardly with respect to the front segment; and FIG. 10 is a chart illustrating the force versus the displacement for the drawbar of FIG. 5 compared to a typical spring drawbar.

DETAILED DESCRIPTION

Figure 1:
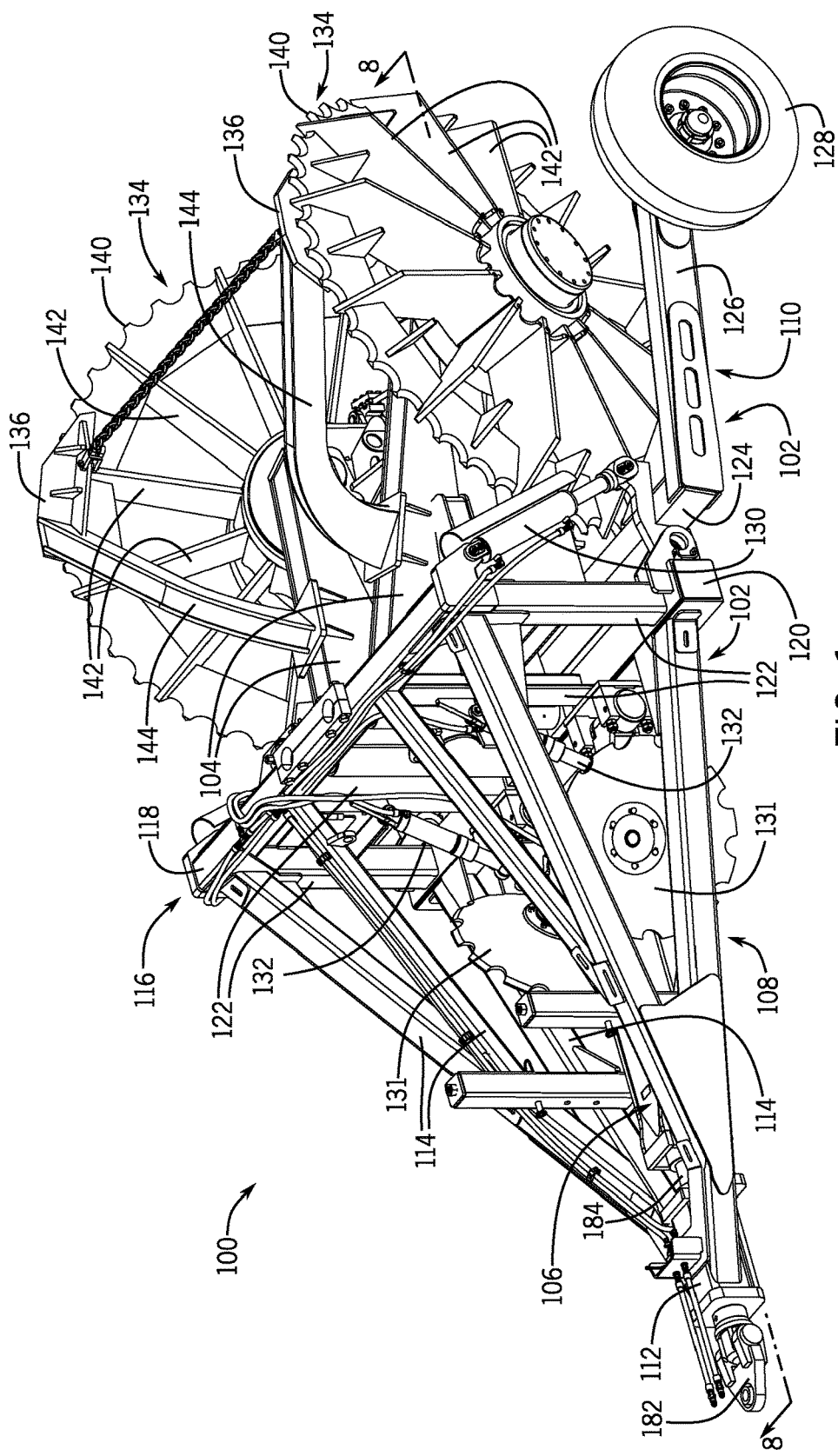
FIG. 1 is a front, top, right perspective view of a stump pulling apparatus.
Figure 2:
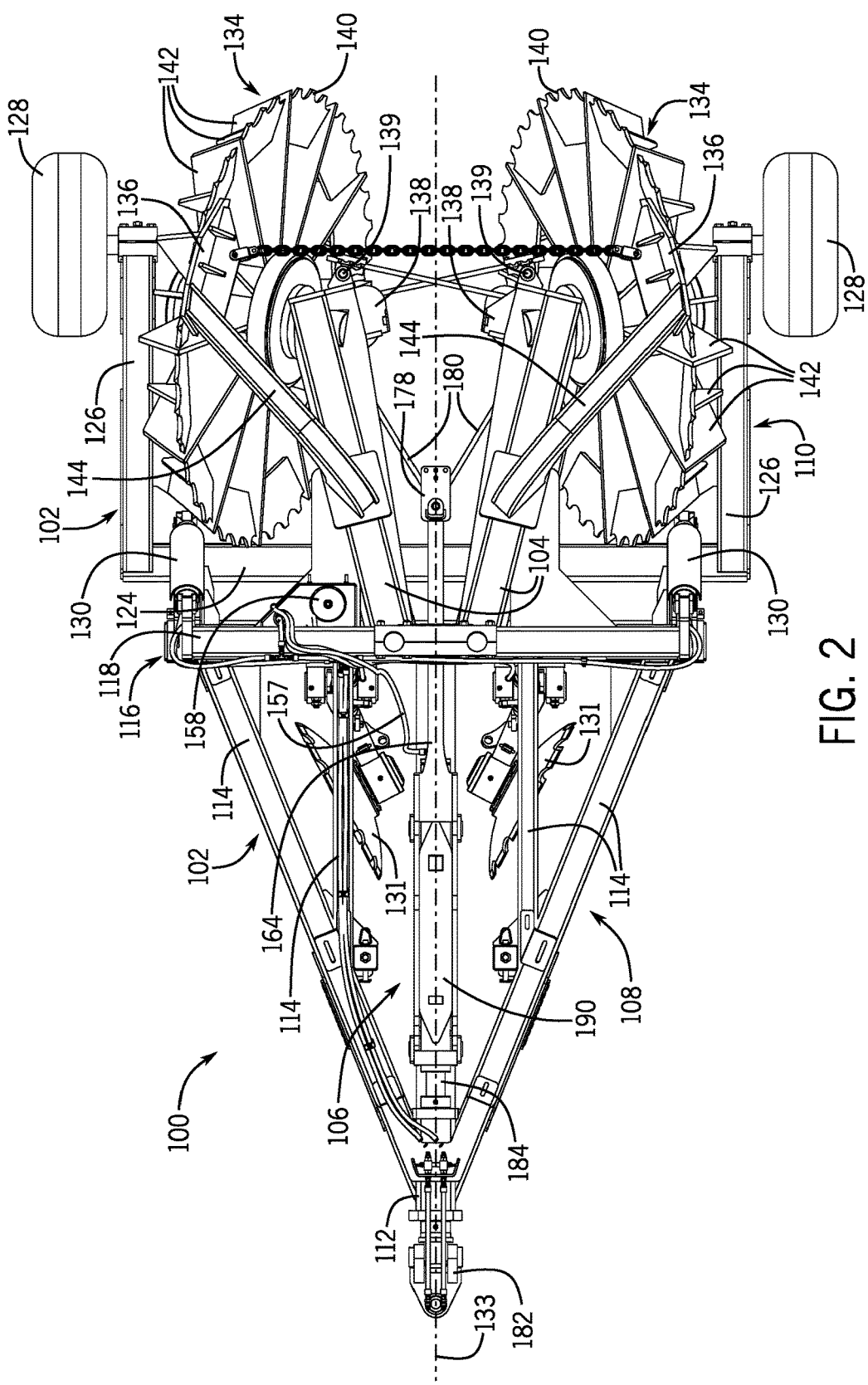
FIG. 2 is a top view of the stump pulling apparatus of FIG. 1.

Referring first to FIGS. 1 and 2, a stump pulling apparatus 100 is illustrated. The stump pulling apparatus 100 is of a type that can be towed by a vehicle such as a tractor (not shown) and can be used to engage stumps of varying sizes and subsequently pull the stumps out of the ground.

The stump pulling apparatus 100 includes a frame 102, a pair of arms 104, and a drawbar 106. The frame 102 includes a front portion 108 and a rear portion 110. The front portion 108 includes a sleeve 112, a plurality of rearwardly-extending supports 114, and a vertical frame section 116. The sleeve 112 is configured to slidably engage a portion of the drawbar 106, as will be described below, and is rigidly coupled to at least one of the plurality of rearwardly-extending supports 114. The rearwardly-extending supports 114 extend rearwardly from the sleeve 112 and are coupled or attached to various locations on the vertical frame section 116. The vertical, frame section 116 extends between lateral sides of the stump pulling apparatus 100 and includes an upper crossbar 118 and a lower crossbar 120 connected by a plurality of vertical frame linkages 122.

The rear portion 110 of the frame 102 is hingedly coupled to the front portion 108 and includes a main crossbar 124, a pair of legs 126, and a pair of towing wheels 128. The main crossbar 124 extends between lateral sides of the stump pulling apparatus 100 and is hingedly coupled to the lower crossbar 120 of the front portion 108. The pair of legs 126 extend rearwardly from lateral ends of the main crossbar 124 and each include a corresponding one of the pair of towing wheels 128.

Additionally, the frame 102 includes a pair of towing wheel displacement cylinders 130. The pair of towing wheel displacement cylinders 130 are each disposed between the front portion 108 and the rear portion 110, and are actuatable to hingedly rotate the rear portion 110 with respect to the front portion 108, as will be described below.

Furthermore, the frame 102 includes a pair of cutting wheels 131 and a pair of cutting wheel displacement cylinders 132. Each of the pair of cutting wheels 131 is coupled to the vertical frame section 116 via a corresponding one of the pair of cutting wheel displacement cylinders 132. Each of the cutting wheel displacement cylinders 132 are configured to actuate a corresponding one of the pair of cutting wheels 131, as will be described below.

The pair of arms 104 are pivotally coupled to the upper crossbar 118 and the lower crossbar 120 of the vertical frame section 116 such that the arms 104 are pivot able about a generally vertically extending axis of rotation. The pair of arms 104 are further disposed between the upper crossbar 118 and the lower crossbar 120 on opposing sides of a center of the vertical frame section 116. The pair of arms 104 extend from the vertical frame section 116, both rearwardly and away from a central axis 133 of the frame 102. The pair of arms 104 includes a pair of stump-engaging wheels 134, stump-engaging wheel scrapers 136, drawbar-engaging pulleys 138, and cable anchors 139.

The pair of stump-engaging wheels 134 are each rotatably mounted on a corresponding arm 104 of the pair of arms 104, proximate a rear end of the corresponding arm 104. Each of the pair of stump-engaging wheels 134 includes a serrated edge 140 and a plurality of support ribs 142.

Figure 3:
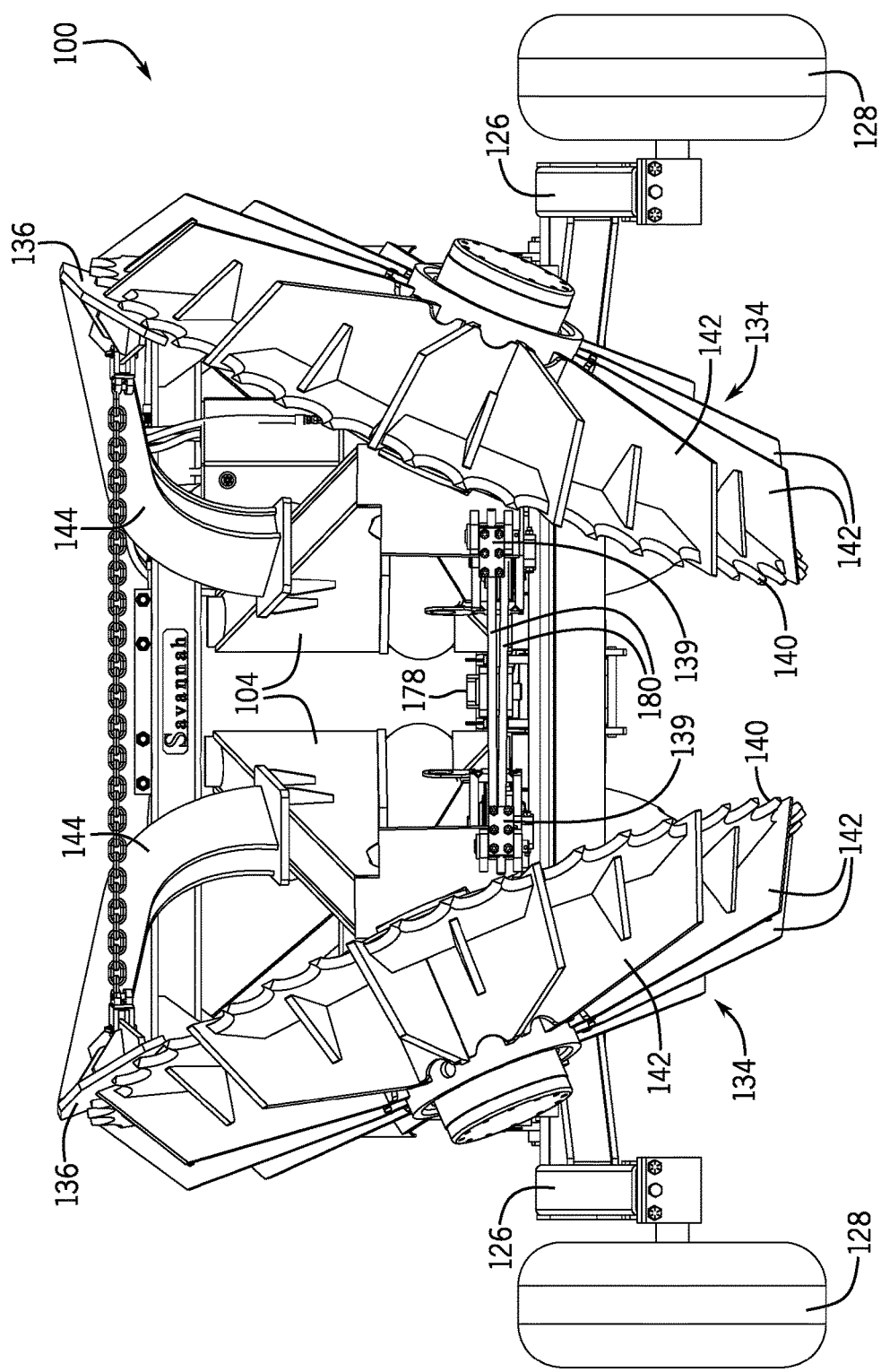
FIG. 3 is a rear view of the stump pulling apparatus of FIG. 1.
Figure 4:
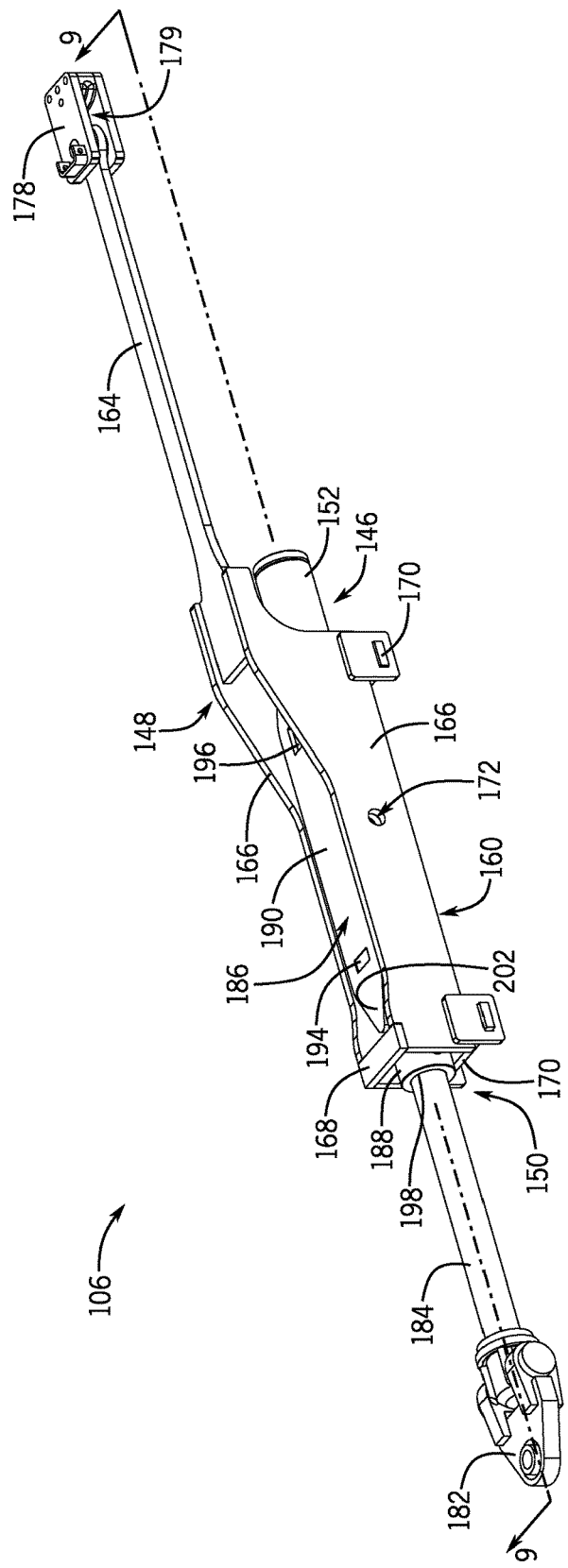
FIG. 4 is a front, top, right perspective view of the drawbar of the stump pulling apparatus of FIG. 1 apart from the remainder of the apparatus.

As best shown in FIG. 3, the pair of stump-engaging wheels 134 are tilted inwardly at the bottom and rear edges. This configuration, as well as the serrated edge 140 and reinforcement provided by the support ribs 142, allows the stump-engaging wheels 134 to pull the stumps out of the ground, as will, be described in detail below.

The stump-engaging wheel scrapers 136 are each coupled to a corresponding one of the pair of arms 104 by a scraper arm 144. The scraper arm 144 extends rearwardly from a top surface of the corresponding arm 104, terminating proximate a top edge of the corresponding stump-engaging wheel 134. The stump-engaging wheel scrapers 136 are each coupled to a rear end of the corresponding scraper arm 144 and configured to remove debris from the corresponding stump-engaging wheel 134.

Figure 5:
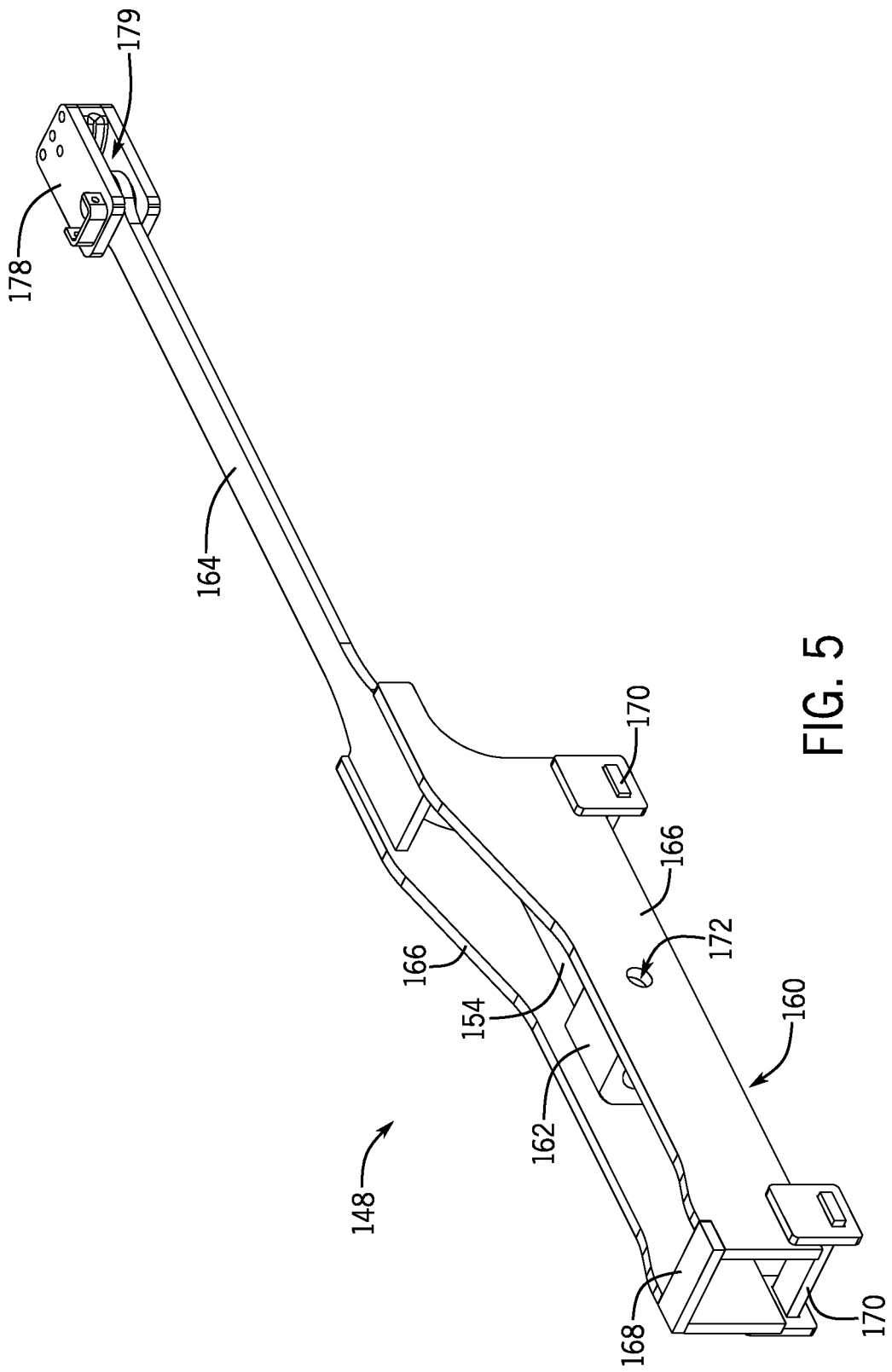
FIG. 5 is a front, top, right perspective view of the rear segment of the drawbar of FIG. 4.
Figure 6:
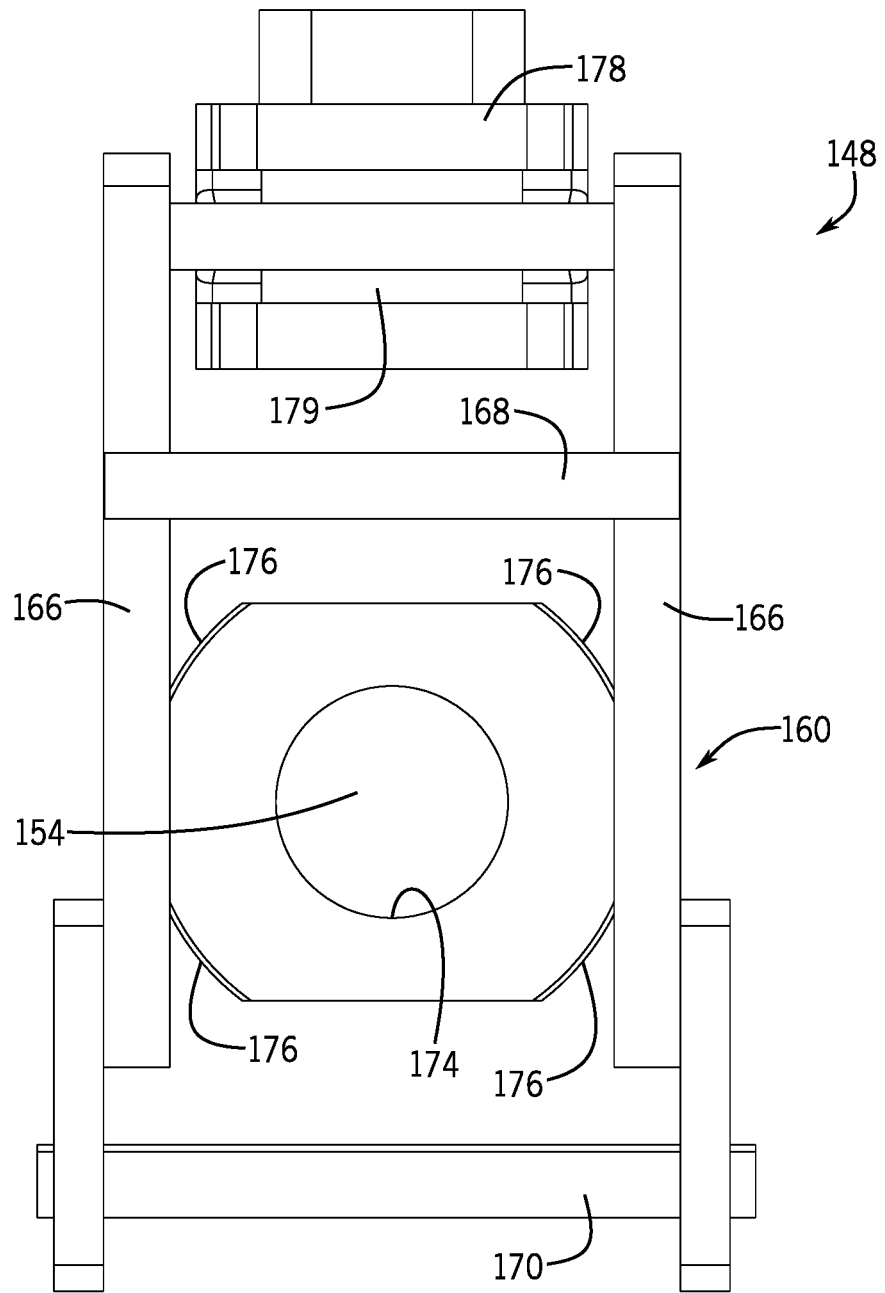
FIG. 6 a front view of the rear segment of the drawbar of FIG. 4.
Figure 7:
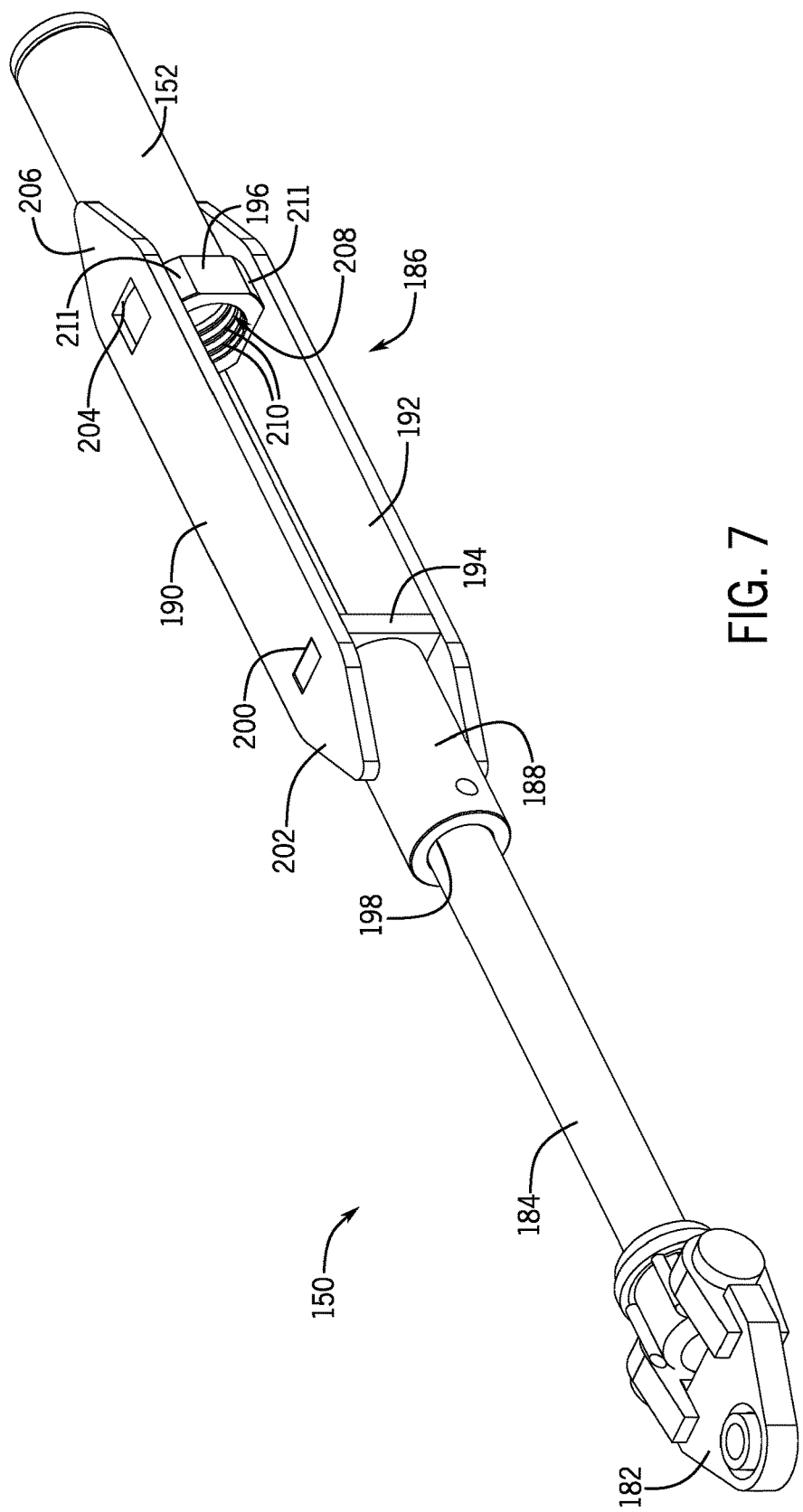
FIG. 7 is a front, top, right perspective view of the front segment of the drawbar of FIG. 4.

Referring now to FIGS. 4-7, the drawbar 106 includes a displacement cylinder 146, a rear segment 148 (best shown in FIGS. 5 and 6), and a front segment 150 (best shown in FIG. 7).

The displacement cylinder 146 is coupled to and intermediately disposed between the front segment 150 and the rear segment 148. The displacement cylinder 146 includes a hollow outer cylinder 152, as best shown in FIG. 7, and an inner rod 154, as best shown in FIGS. 5 and 6. The inner rod 154 is partially enclosed by the hollow outer cylinder 152, which creates an internal pressure chamber 155 that is pneumatically charged through the inlet port 156 (each shown in FIGS. 9A and 9B) using pneumatic hoses 157 which are connected to a pneumatic accumulator tank 158 (each shown in FIG. 2), as will be described below. The internal pressure chamber 155, the pneumatic hoses 157, and the pneumatic accumulator tank 158 can all be pre-charged to an initial pressure with nitrogen or any other suitable inert gas.

Referring to FIGS. 5 and 6, the rear segment 148, which is slidably coupled to the front segment 150, includes a rear body 160, a guide 162, and a tail extension 164. The rear body 160 includes sidewalls 166, an upper cross-linkage 168, and lower cross-linkages 170. The sidewalls 166 each include an opening 172 disposed proximate a center of the corresponding sidewall 166. The upper cross-linkage 168 is disposed at a front end of the rear body 160 and spans between upper edges of the sidewalls 166. Additionally, the upper cross-linkage 168 is rigidly coupled to each of the sidewalls 166. As illustrated, there are two lower cross-linkages 170. One of the lower cross-linkages 170 is disposed at the front end of the rear body 160. The other lower cross-linkage 170 is disposed at a rear end of the rear body 160. Each of the lower cross-linkages 170 span between lower edges of the sidewalls 166 and are further rigidly coupled to each of the sidewalls 166.

The guide 162 includes an inner rod opening 174, which is configured to fixedly receive the inner rod 154 of the displacement cylinder 146. The guide 162 and the inner rod 154 include aligning laterally-extending thru-holes (not shown), which are used in conjunction with the opening 172 to rigidly fix the inner rod 154, the guide 162, and the sidewalls 166 relative to one another using a pin, bolt, or any other suitable fastener (not shown). Additionally, the guide 162 further includes rounded corners 176.

The tail extension 164 is disposed at the rear end of the rear body 160, proximate the upper edges of the sidewalls 166. Additionally, the tail extension 164 spans between and is coupled to each of the sidewalls 166. Further, the tail extension 164 extends rearwardly from the rear body 160 and includes a cable-engagement mechanism 178 disposed at a rear end of the tail extension 164. The cable-engagement mechanism 178 includes a curved internal cable path 179 and is configured to engage a cable 180.

Figure 8:
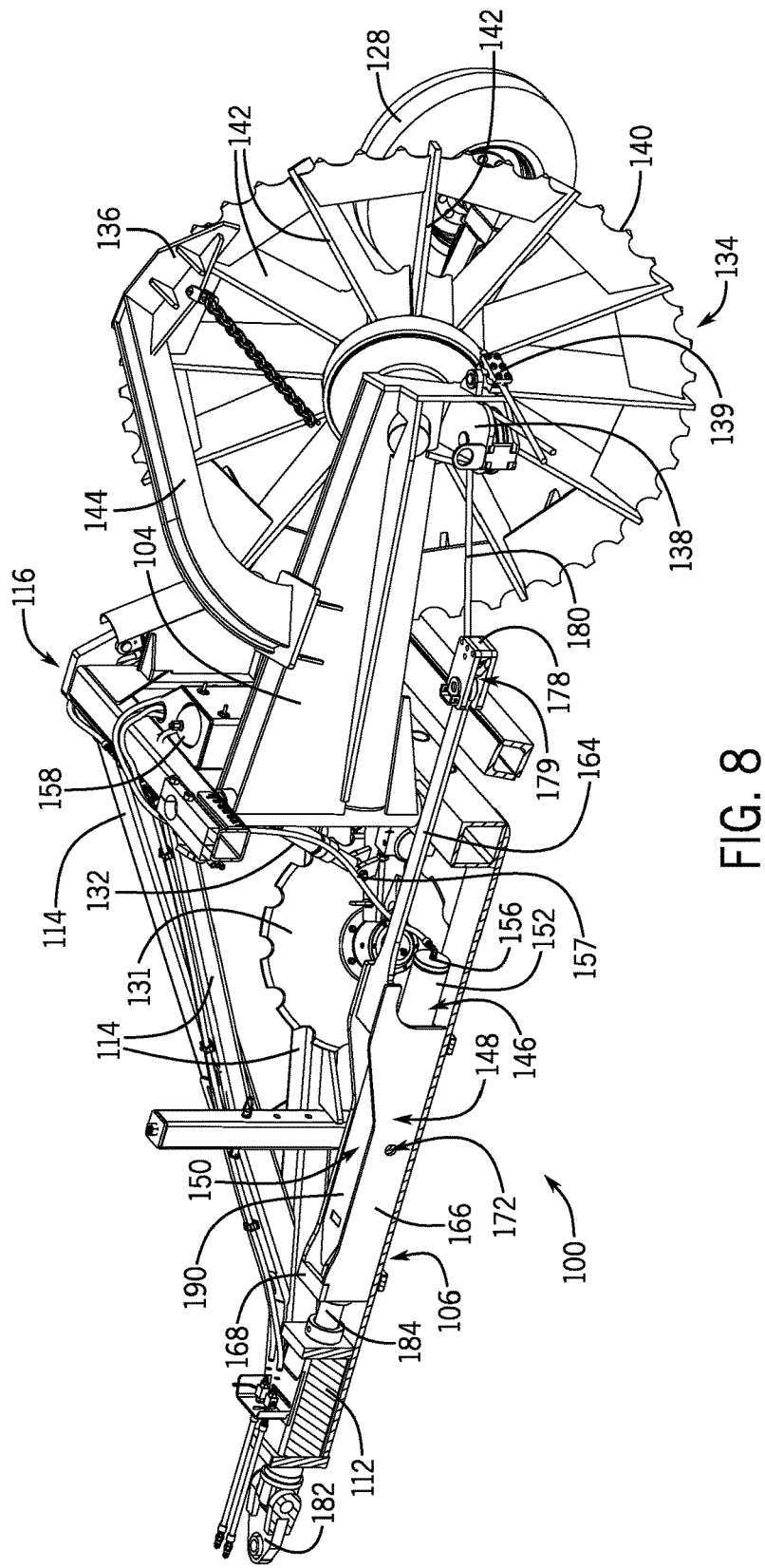
FIG. 8 a perspective cross-sectional view of the stump pulling apparatus of FIG. 1, taken along line 8-8.

As best illustrated in FIGS. 2 and 8, the cable 180 is coupled to the cable anchor 139 of a first one of the pair of arms 104, then extends around the drawbar-engaging pulley 138 of a second one of the pair of arms 104, then extends toward and through the curved internal cable path 179 of the cable-engagement mechanism 178, then extends around the drawbar-engaging pulley 138 of the first one of the pair of arms 104, and is coupled to and terminates at the cable anchor 139 of the second one of the pair of arms 104.

It is contemplated that, while the illustrated rear segment 148 comprises several individual components that are rigidly fixed together, in some instances, the components of the rear body 160, as well as the tail extension 164, could be formed of a single unitary body.

Referring to FIG. 7, the front segment 150, which is partially enclosed by the rear segment 148, includes a hitch 182, a rod 184, and a front body 186. The hitch 182 is configured to be attached to a vehicle for pulling the apparatus 100. The rod 184 is coupled to and extends between the hitch 182 and the front body 186. Additionally, the rod 184 is partially enveloped by the sleeve 112 of the frame 102, but is allowed to freely slide in an axial direction within the sleeve 112.

The front body 186 includes a rod-receiving cylinder 188, an upper wall 190, a lower wall 192, a rod-engagement block 194, and a cylinder-engagement block 196. The rod-receiving cylinder 188 includes a rod-receiving recess 198 disposed on a front face of the rod-receiving cylinder 188, which is configured to receive the rod 184. The rod 184 and the rod-receiving cylinder 188 include aligning laterally-extending thru-holes, which are used to rigidly fix the rod 184 within the rod-receiving recess 198 using a pin, bolt, or any other suitable fastener (not shown). The rod-receiving cylinder 188 is further rigidly fixed to the rod-engagement block 194 by welding or other attachment.

The upper wall 190 and the lower wall 192 each include a front slot 200, a tapered front end 202, a rear slot 204, and a tapered rear end 206. The rod-engagement block 194 extends into each of the front slots 200 and the rod-receiving cylinder 188 is rigidly coupled to the tapered front ends 202. The cylinder-engagement block 196 includes an inner rod opening 208 having a plurality of ribs 210, and similarly extends into each of the rear slots 204. The cylinder-engagement block 196 is further rigidly coupled to the hollow outer cylinder 152, which is rigidly coupled to the tapered rear ends 206. As such, the entire front body 186 illustrated in FIG. 7 is rigidly fixed together.

It should be noted that each of the rod-engagement block 194 and the cylinder-engaging block 196 includes chamfered corners 211 that correspond to the rounded corners 176, providing axial openings extending through the front body 186 and the rear body 160, such that pressure does not build within the internal space 212 (shown in FIG. 9B), when the guide 162 slides forward relative to the front body 186.

It is contemplated that, while the illustrated front body 186 comprises several individual components that are rigidly fixed together, in some instances the front body 186 could be formed of a single unitary body. In other instances, various components of the front body 186 could be formed together and then rigidly coupled to various other components to form the front body 186. For example, the upper wall 190, the lower wall 192, the rod-engagement block 194, and the cylinder-engagement block 196 could all be formed together as a single unitary body, which could then be rigidly coupled to the rod-receiving cylinder 188 and the hollow outer cylinder 152.

Now that the various components of the stump pulling apparatus 100 have been described above, an exemplary method of use for the stump pulling apparatus 100 will be described.

As mentioned above, the hitch 182 can be coupled to a vehicle (not shown) for towing the stump pulling apparatus 100. Referring to FIGS. 1 and 3, during transit, the towing wheel displacement cylinders 130 can be actuated to hingedly rotate the rear portion 110 of the frame 102 with respect to the front portion 108 to lower the pair of towing wheels 128 and raise the stump-engaging wheels 134 out of contact with the ground. Similarly, the pair of cutting wheel displacement cylinders 132 can be actuated to raise the pair of cutting wheels 131 out of contact with the ground.

During use, the towing wheel displacement cylinders 130 can be actuated to hingedly rotate the rear portion 110 with respect to the front portion 108 to raise the pair of towing wheels 128 and lower the pair of stump-engaging wheels 134 into engagement with the ground. Further, the pair of cutting wheel displacement cylinders 132 can be actuated to lower the pair of cutting wheels 131 into engagement with the ground.

Now with reference to FIGS. 9A and 9B, when the hitch 182 is pulled forward by the vehicle, the front segment 150 slides forward, relative to the rear segment 148. As the front segment 150 slides forward, the hollow outer cylinder 152 slides forward relative to the inner rod 154, thereby reducing the volume of the internal pressure chamber 155. As the volume of the internal pressure chamber 155 is reduced, pressure builds within the internal pressure chamber 155. The pressure within the internal pressure chamber 155 depends on both the pre-charged pressure of the internal pressure chamber 155 and a relative displacement 214 between the front segment 150 and the rear segment 148. The pressure build up within the internal pressure chamber 155 further provides a forwardly-acting force on the inner rod 154. This forwardly-acting force pushes the inner rod 154 and, because the inner rod is rigidly fixed to the rest of the rear segment 148, the rear segment 148 forward.

Turning now to FIGS. 2 and 8, as the rear segment 148 is pushed forward, the cable-engagement mechanism 178 pulls on the cable 180. As the cable 180 is pulled forward, the cable 180 provides a forwardly-acting force on the stump-engaging wheels 134. This forwardly-acting force is further transmitted through the pair of arms 104 to the frame 102, thereby pushing the frame 102 forward.

Additionally, as the cable 180 is pulled forward, the configuration of the cable 180 (that is, the cable 180 extending from the cable-engagement mechanism 178, wrapping around the drawbar-engaging pulleys 138, and connecting to the opposing cable anchors 139) provides a clamping force between the pair of stump-engaging wheels 134. As such, the clamping force between the pair of stump-engaging wheels 134 corresponds to the pressure built within the internal pressure chamber 155, which corresponds to the relative displacement 214 between the front segment 150 and the rear segment 148.

While the stump pulling apparatus 100 is pulled forward, the pair of cutting wheels 131 engage the ground in front of the pair of stump-engaging wheels 134, cutting into the ground and tree stump roots. Additionally, while the stump pulling apparatus 100 is pulled forward, the pair of stump-engaging wheels 134 also engage the ground, which, due to the tilted configuration of the pair of stump-engaging wheels 134, forces the pair of stump-engaging wheels 134 apart, providing a counterforce to the clamping force imposed on the pair of stump-engaging wheels 134 by the displacement cylinder 146.

As such, when the stump pulling apparatus 100 is pulled forward, the front segment 150 and the rear segment 148 slide relative to each other until the relative displacement 214 causes a high enough pressure build-up within the internal pressure chamber 155, such that the clamping force imparted on the pair of stump-engaging wheels 134 by the rear segment 148 matches the separating force imparted on the pair of stump-engaging wheels 134 by the ground.

Similarly, when the pair of stump-engaging wheels 134 engage a stump, the stump forces the pair of stump-engaging wheels 134 to spread apart, which causes the rear segment 148 to slide relative to the front segment 150. Once the relative displacement 214 is sufficiently high, the pressure built up within the internal pressure chamber 155 provides a sufficiently high clamping force between the pair of stump-engaging wheels 134, the pair of stump-engaging wheels 134 stop spreading apart and become engaged with the stump.

Because of the tilted configuration of the pair of stump-engaging wheels 134, as the pair of stump-engaging wheels 134 roll into the stump and become engaged with the stump, the clamping force imparted on the pair of stump-engaging wheels 134 causes the serrated edge 140 to cut slightly into the stump, providing a secure grip on the stump. As the pair of stump-engaging wheels 134 continues to roll, while securely gripping the stump, the pair of stump-engaging wheels 134 are configured to pull the stump up and out of the ground.

The front segment 150 and rear segment 148 of the drawbar 106 are configured to slide relative to each other such that the relative displacement 214 create a sufficiently high pressure within the internal pressure chamber 155 to provide a high enough clamping force between the pair of stump-engaging wheels 134 to remove stumps having a diameter between about 4 inches and about 23 inches.

Additionally, it should be noted that, in the case that the relative displacement 214 does not provide a high enough clamping force between the pair of stump-engaging wheels 134, the pre-charged pressure of the internal pressure chamber 155 can be increased by using the pneumatic accumulator tank 158 to supply pneumatic pressure, through the pneumatic hoses 157 into the inlet port 155 of the internal pressure chamber 156, until the clamping force between the pair of stump-engaging wheels 134 is sufficient.

Referring now to FIG. 10, a chart 300 is provided illustrating the clamping force (lbf) between the pair of stump-engaging wheels 134 versus the relative displacement 214, measured in inches, between the front segment 150 and the rear segment 148 using the displacement cylinder 146, which is shown as line 302, and alternatively using a standard spring currently used in the art, which is shown as line 304. As can be seen, using the displacement cylinder 146, an increase in the relative displacement results in a semi-exponential growth in clamping force. Alternatively, using the standard spring, an increase in the relative displacement results in a linear growth in clamping force. Specifically, because of the semi-exponential growth in clamping force provided by the displacement cylinder 146, the displacement cylinder 146 is capable of providing much higher clamping forces in a smaller relative displacement distance than compared to the standard spring.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A stump pulling apparatus configured to be towed by a vehicle, the stump pulling apparatus comprising:
    a frame;
    a pair of arms pivotally mounted to the frame, each of the pair of arms extending both rearwardly and away from a central axis of the frame;
    a pair of stump-engaging wheels, each of the pair of stump-engaging wheels rotatably mounted on a corresponding one of the pair of arms at a rear end of the corresponding one of the pair of arms;
    a drawbar including a front segment, a rear segment, and a displacement cylinder, the front segment being configured to engage the vehicle for towing the stump pulling apparatus and being slidably coupled to the rear segment, the rear segment coupled to each of the pair of arms, the displacement cylinder being coupled to and intermediately disposed between the front segment and the rear segment; and
    wherein, when the front segment of the drawbar is pulled forward, the displacement cylinder provides a forwardly-acting force on the rear segment, which pivots the pair of arms toward each other, thereby forcibly bringing the stump-engaging wheels together.

2. The stump pulling apparatus of claim 1, wherein when the pair of stump-engaging wheels are forcibly brought together, the pair of stump-engaging wheels are configured to engage a stump that has a diameter between about 4 inches and about 23 inches.

3. The stump pulling apparatus of claim 2, wherein when the pair of stump-engaging wheels engage the stump, the displacement cylinder provides sufficient forwardly acting force on the rear segment, such that the pair of stump-engaging wheels are capable of pulling the stump out of the ground.

4. The stump pulling apparatus of claim 1, further comprising:
    the front segment having a hitch, a rod, and a front body, the hitch being configured to engage the vehicle, the rod being coupled to and extending between the hitch and the front body, the front body being engaged by the displacement cylinder; and
    the rear segment having a tail extension and a rear body, the tail extension engaging each of the pair of arms and the rear body being engaged by the displacement cylinder.

5. The stump pulling apparatus of claim 1, wherein the frame includes a front portion and a rear portion, the front portion slidably engaging the drawbar, the rear portion hingedly engaging the front portion and including a pair of towing wheels disposed at a rear end of the rear portion.

6. The stump pulling apparatus of claim 5, wherein the pair of towing wheels is actuatable using a pair of towing wheel displacement cylinders to do one of lower the pair of towing wheels, thereby raising the pair of stump-engaging wheels out of engagement with the ground, and raise the pair of towing wheels, thereby lowering the pair of stump-engaging wheels into engagement with the ground.

7. The stump pulling apparatus of claim 1, further comprising a pair of cutting wheels coupled to the frame and disposed in front of the pair of stump-engaging wheels.

8. The stump pulling apparatus of claim 7, wherein the pair of cutting wheels is actuatable using a pair of cutting wheel displacement cylinders to do one of lower the cutting wheels into engagement with the ground to cut roots near the stump and raise the cutting wheels out of engagement with the ground.

9. The stump pulling apparatus of claim 1, wherein each of the pair of arms further includes a stump-engaging wheel scraper.

10. The stump pulling apparatus of claim 9, wherein the stump-engaging wheel scraper is configured to remove debris from the corresponding stump-engaging wheel.

11. The stump pulling apparatus of claim 1, wherein the displacement cylinder is pneumatically charged.

12. A drawbar for a stump pulling apparatus, the stump pulling apparatus being configured to be towed by a vehicle and having a pair of pivotal arms, each of the pair of pivotal arms including a stump-engaging wheel, the drawbar comprising:
    a displacement cylinder including a hollow outer cylinder and an inner rod, the inner rod partially enclosed by the hollow outer cylinder, thereby creating an internal pressure chamber;
    a front segment having a hitch, a rod, and a front body, the hitch being configured to engage the vehicle, the rod being coupled to and extending between the hitch and the front body, the front body being coupled to one of the hollow outer cylinder and the inner rod;
    a rear segment having a tail extension and a rear body, the tail extension being coupled to each of the pair of pivotal arms, the rear body being coupled to a different one of the hollow outer cylinder and the inner rod; and
    wherein the front body is slidably coupled to the rear body and, when the front body is pulled forward, pressure is built within the pressure chamber of the displacement cylinder which is configured to provide a forwardly-acting force on the rear body.

13. The drawbar of claim 12, wherein when the rear body is pulled forward, the tail extension is configured to pivot the pair of arms toward each other and forcibly bring the stump-engaging wheels together.

14. The drawbar of claim 12, wherein the displacement cylinder is a pneumatically charged displacement cylinder.

15. The drawbar of claim 12, wherein the forwardly-acting force increases semi-exponentially when the front body is slid rearward with respect to the rear body.

16. The drawbar of claim 12, wherein the front body includes a pair of opposed walls, each of the pair of opposed walls including at least one slot.

17. The drawbar of claim 16, wherein the rod is coupled to an outer sleeve cylinder and the outer sleeve cylinder engages the at least one slot.

18. The drawbar of claim 16, wherein the hollow outer cylinder engages the at least one slot.

19. The drawbar of claim 12, wherein the tail extension includes a cable-engagement mechanism having a curved internal cable path.

20. The drawbar of claim 19, wherein the curved internal cable path is configured to engage a cable, which engages each of the pair of pivotal arms.

* * * * *